(12) United States Patent  
Zhu

(10) Patent No.: US 7,233,459 B2  
(45) Date of Patent: Jun. 19, 2007

(54) INTEGRAL WEAR-PAD FOR SLIDER-DISK INTERFERENCE DETECTION

(75) Inventor: Li-Yan Zhu, San Jose, CA (US)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 476 days.

(21) Appl. No.: 10/853,458

(22) Filed: May 25, 2004

(65) Prior Publication Data

US 2005/0264939 A1    Dec. 1, 2005

(51) Int. Cl.  
*G11B 5/60* (2006.01)

(52) U.S. Cl. .............. 360/235.7; 360/235.4; 360/236.5; 360/236.6

(58) Field of Classification Search ............ 360/235.4, 360/235.7, 236.5, 236.6  
See application file for complete search history.

(56) References Cited

U.S. PATENT DOCUMENTS

| | | | |
|---|---|---|---|
| 5,825,587 A | 10/1998 | Bolasna et al. | 360/103 |
| 6,317,210 B1 | 11/2001 | Wen et al. | 356/375 |
| 6,477,012 B1 | 11/2002 | Park et al. | 360/236.1 |
| 6,493,185 B1 * | 12/2002 | Dorius et al. | 360/235.7 |
| 6,665,077 B1 | 12/2003 | Stirniman et al. | 356/507 |
| 6,707,631 B1 * | 3/2004 | Haddock | 360/75 |
| 6,714,382 B1 | 3/2004 | Alexopoulos et al. | 360/235.8 |
| 6,967,818 B2 * | 11/2005 | Baumgart et al. | 360/234.7 |
| 2002/0063994 A1 * | 5/2002 | Ueda et al. | 360/235.8 |
| 2002/0089788 A1 * | 7/2002 | Baumgart et al. | 360/235.7 |
| 2002/0197936 A1 * | 12/2002 | Smith | 451/41 |
| 2004/0011957 A1 * | 1/2004 | Yoshiki et al. | 250/307 |
| 2004/0066581 A1 * | 4/2004 | Kameyama | 360/236.2 |
| 2004/0082277 A1 * | 4/2004 | Smith | 451/41 |
| 2004/0085670 A1 * | 5/2004 | Li et al. | 360/75 |

* cited by examiner

*Primary Examiner*—Jefferson Evans  
(74) *Attorney, Agent, or Firm*—Saile Ackerman LLC; Stephen B. Ackerman

(57) ABSTRACT

A slider-mounted transducer has an integral wear pad for determining interference between the transducer and a disk surface. The wear pad intensifies interference events during disk drive testing and enables the threshold for slider fly-height to be set at a lower level. This, in turn, improves disk drive reliability during normal operation. The wear pad can be a carbon overlay deposited near the trailing edge of the slider or it can be an un-etched strip of alumina within a recessed region of the slider. The wear pad is substantially worn away during the test period, so it does not affect subsequent operation of the drive.

16 Claims, 3 Drawing Sheets

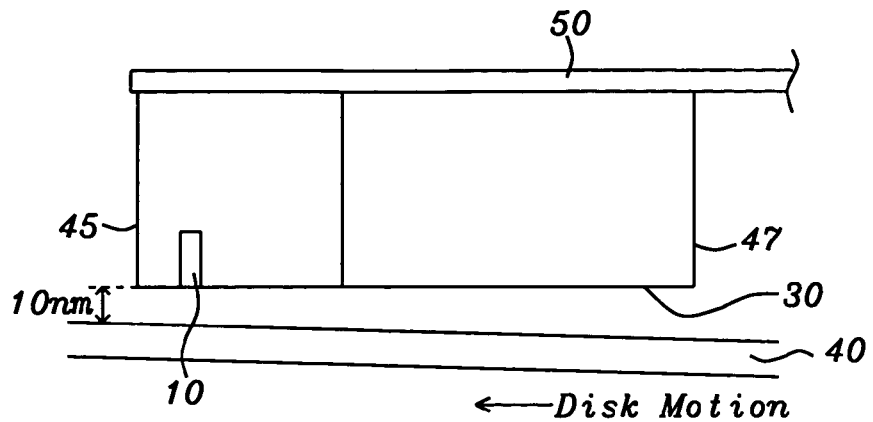
FIG. 1a – Prior Art
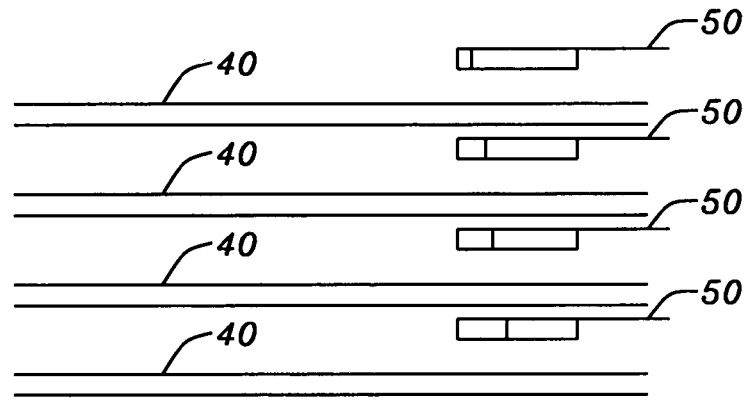
FIG. 1b – Prior Art
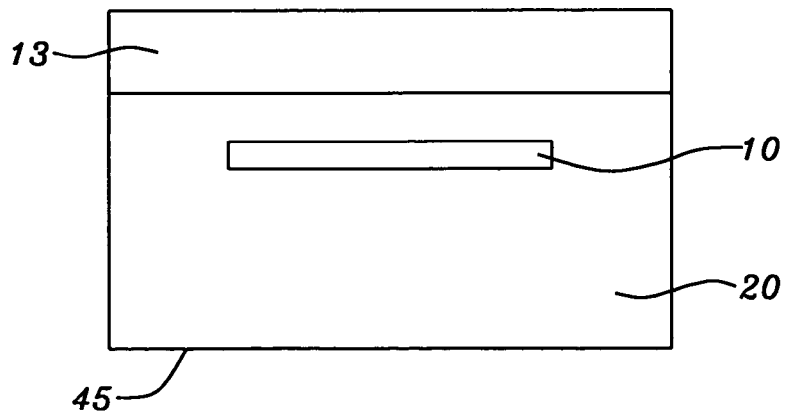
FIG. 2a – Prior Art

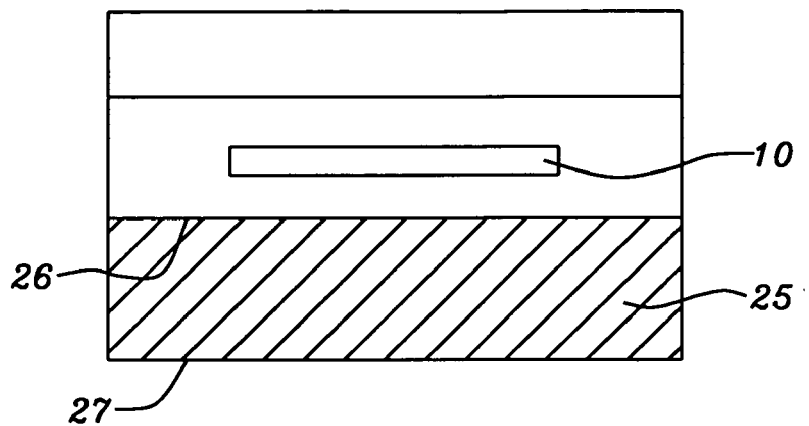
FIG. 2b - Prior Art
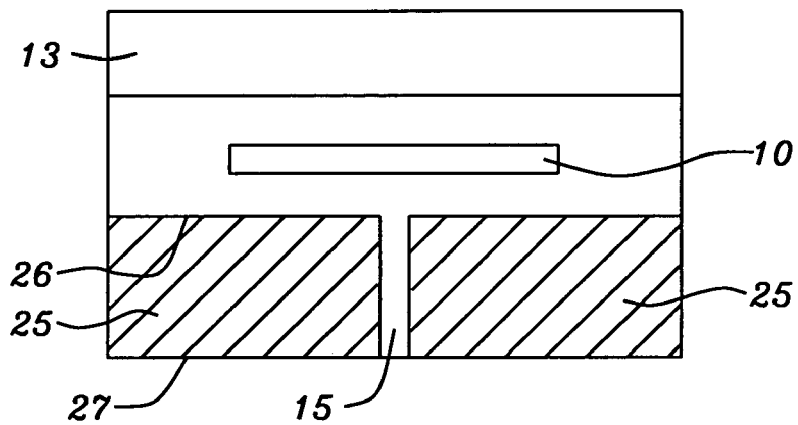
FIG. 3a
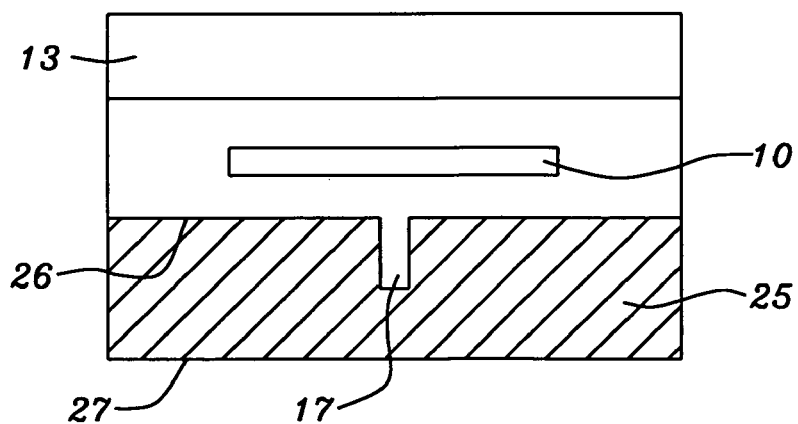
FIG. 3b

INTEGRAL WEAR-PAD FOR SLIDER-DISK INTERFERENCE DETECTION

BACKGROUND OF THE INVENTION

1. Field of the Invention

This invention relates generally to the fabrication of magnetic transducers for disk drives and more particularly to a method of improving the reliability of the fly-height of the air-bearing-surface (ABS) of the transducer above the disk surface.

2. Description of the Related Art

In a magnetic recording disk drive there is at least one magnetic transducer which includes a read-head and a write-head incorporated within a slider. One such transducer and its associated disk is shown in (prior-art) FIG. 1a. In this figure the lower surface of the transducer (10) is co-planar with and contained within a smooth surface plane of the slider (30), called the air-bearing-surface (ABS) plane. Note that the slider is mounted on a head-gimbals assembly (50), which is shown in highly schematic form. In a disk drive containing a plurality of sliders and disks, the system shown in FIG. 1a is replicated in the vertical direction as shown in (prior-art) FIG. 1b.

During operation of the disk drive, the slider literally flies over the surface of a rapidly spinning disk (40), suspended by air flow at a "fly-height" above the disk surface. The trailing edge of the slider (45), which is the edge past which a given portion of the disk moves last, is extremely close to the disk surface, suspended on the order of 10 nanometers (nm). The leading edge of the slider (47), which is the edge past which a given portion of the disk first moves, is significantly higher, on the order of 100 nm. Although low fly-height is desirable for high magnetic resolution of the transducer, it has distinctly negative effects on the reliability of the disk drive. Specifically, the low fly-height causes frequent and severe interference between the slider and the disk, damaging both the transducer and the ABS.

To maximize the benefit of low fly-height, the transducer is mounted very close to the trailing edge of the slider. In a typical wafer fabrication process, the transducer is located approximately 20 microns from the top of a finished wafer surface. When such a wafer is cut into sliders, the transducer is located approximately 20 microns from the trailing edge of the slider. Since the typical pitch angle (angle of the ABS relative to the disk surface) of the slider ABS is between 100 and 350 micro-radians, the fly-height difference corresponding to the 20 micron transducer-to-trailing edge distance is between 2 and 7 nm. This is a significant difference, when the desired fly-height itself is on the order of 10 mn.

Since it is relatively difficult to move the transducer closer to the trailing edge in fabrication, the trailing edge has effectively been moved closer to the transducer by the following method. In the prior art, the portion of the slider ABS between the transducer and the trailing edge of the slider is recessed by etching or other means during slider fabrication. Thus, the lowest fly-height is no longer at the actual physical edge of the slider, it is now at the edge of the recess. The recess can be made closer to the transducer by an amount on the order of 5 microns.

Referring to prior art FIG. 2a, there is shown a schematic ABS view of a transversely oriented transducer (10) emerging at the ABS plane of a slider, showing the position of the transducer relative to the transverse trailing edge (45) of the slider. The portion of the slider ABS containing the transducer ABS (20) is formed of alumina, the portion of the slider (shown foreshortened) above the transducer (13) is formed of AlTiC. The entire figure represents a single planar surface.

Referring to FIG. 2b, there is shown the basic configuration of FIG. 2a, modified by the addition of a substantially rectangular recessed (into the plane of the figure) portion (25), having two transverse edges (26) and (27). The recessed portion is shown shaded for clarity and it is a substantially planar surface, formed by etching, that lies below the planar surface of the ABS plane. One transverse edge, called herein the first edge, of the recessed portion (26) is closer to the transducer (10), than is the second transverse edge (27), which is now also the trailing edge of the slider.

Superficially, the above approach of forming a recessed region would seem to allow the transducer to fly approximately 2 nm lower (ie closer to a disk surface) without negative side effects. In fact, by recessing the ABS downstream (towards the trailing edge) from the transducer as shown above, the transducer can fly approximately 2 nm lower without increasing the mechanical stress on the disk. The mechanical stress on the transducer, however, does increase, as can be shown by the following reasoning. First, ignore the transducer and trailing edge recess and consider a planar ABS flying at a positive pitch. In a typical interference event between a slider ABS and a disk surface, whether caused by surface roughness of the disk or by a foreign particle on the disk surface, mechanical stress increases monotonically with decreasing fly-height. Thus, the stress peaks at the trailing edge of the ABS. The same is true when the ABS includes a transducer surface and when the ABS has a recessed area. Thus, at the same trailing edge fly-height, a transducer located closer to the trailing edge of the ABS experiences greater mechanical stress.

The reliability of a disk drive is affected by mechanical stress on the transducer and on the disk. The state of the art GMR read heads are particularly susceptible to mechanical stress. Thus, the recessing of the prior art is not as effective at retaining reliability as might be expected. Other, more complex ABS shapes and designs have been provided in an effort to alleviate the effects of low fly height, particularly as it relates to pitch and roll of the slider. In this regard, Bolsana et al. (U.S. Pat. No. 5,825,587) teach a slider with a support structure and etched side rails to minimize fly height during disk drive operation. Park et al. (U.S. Pat. No. 6,477,012) teach a slider ABS on which are formed a plurality of negative pressure air cavities to provide a more stable flying attitude of the slider during disk drive operation. Alexopoulos et al. teaches an ABS contact surface slider, wherein a wear-pad of negligible sixe contacts the disk surface and maintains the slider at a proper height.

The present invention does not address sliders with complex aerodynamic surface structures or sliders that are maintained at a fixed height by a disk contacting mechanism. Rather, the present invention is directed at more standard and easy to fabricate sliders with substantially ABS planar surfaces that must fly at a height maintained within given tolerances by a rigorous testing scheme.

Returning, then, to the recessed trailing edge slider of FIG. 2b, it is important to realize that, in production, the trailing edge recess only allows the mean transducer fly height to decrease by a finite amount. It does not affect the standard deviation of the fly-height distribution. It is well known that a slider with the nominal (mean) fly height will rarely fail, but the slider with lower than average fly-height will be much more likely to fail. Clearly, such probable failures should be identified and rejected.

At this time, screening the fly-height distribution in production sliders is extremely difficult. An example of an optical apparatus for measuring fly heights is provided by Wen et al. (U.S. Pat. No. 6,317,210). Optical fly-height testers are inaccurate at the fly-height range of interest of 10 nm. and below. Direct detection of interference between the slider and disk by acoustic emission, friction or readback signal modulation is meaningful only if the interference is frequent and intense. An example of an interferometric method for measuring fly height is provided by Stimiman et al. (U.S. Pat. No. 6,665,077).

Existing fly-height or interference screening methods as cited above cannot thoroughly weed out "low-flyers." To ensure disk drive reliability at a production level the nominal (mean) fly-height must be set substantially (e.g. two standard deviations) higher than the minimum acceptable fly-height.

It is highly desirable to increase the sensitivity of interference detection methods so that the nominal fly-height can be set closer to the minimum acceptable fly-height. In that way the magnetic resolution of the transducer can be increased without sacrificing the reliability of the disk drive. The present invention provides a novel, integral, wear-pad which amplifies slider-disk interference during the product screening process, enabling low-fliers to be rejected and thereby allowing the nominal fly-height to be set at a lower level. The wear-pad wears out promptly thereafter, so that it does not itself contribute to slider-disk interference during subsequent operation of the disk drive.

SUMMARY OF THE INVENTION

The primary object of this invention is to provide a method for detecting interference between the ABS of a slider-mounted transducer and the surface of a disk in motion beneath it during disk drive testing, so that sliders that fly at heights below an acceptable minimum can be screened out and a minimum fly-height threshold for disk drive reliability can be set and monitored.

The method of achieving the object of this invention, which will be described in detail with reference to FIGS. 3a, 3b, 4a, 4b and 5, is to form a sacrificial wear-pad integral with the slider ABS. This wear-pad amplifies interference between a slider-mounted transducer and a disk, allowing the interference to be easily detected. The wear pad is a slight protrusion (approximately 2 nm.) from the ABS which raises the threshold for interference with surface irregularities of the disk, roughness of the disk or foreign matter on the disk. Because the protrusion has a very small volume, it wears out quickly, without creating excessive debris. Depending upon the volume, the protrusion can be completely worn away during the test, it can be worn away by intentionally flying the slider at a low height or it may be removed using a laser beam.

In a first preferred embodiment, the protrusion is a narrow strip of ABS which is allowed to remain within the recessed region of the slider ABS. The strip is oriented longitudinally, i.e., perpendicular to the transverse direction of the transducer and substantially bisects the recessed region (FIG. 3a). An additional benefit of this strip is that any remnant remaining after an interference event acts to reduce subsequent mechanical stress in the transducer (FIG. 3b) by moving the region of greatest stress concentration further from the read-head.

In a second preferred embodiment (FIG. 4a) the strip is within the recessed region, perpendicular to the transducer but located off-center within the region. Because the strip is not directly downstream from the transducer, a remnant will not reduce mechanical stress. However, the off-center location makes the strip more effective at detecting low flying sliders that roll. The strips of the first and second embodiments may be combined (FIG. 4b) to produce a wear pad comprising a plurality of strips. In such a case, however, the total volume of the strips should not be so excessive that they are not substantially worn away by the end of testing.

In a third preferred embodiment (FIG. 5) the strip is not an un-etched portion of the recessed region but is a strip or pad of carbon overcoat applied within a uniformly etched recessed region or within an additionally etched area within the recessed region. The thickness of the overcoat strip relative to the depth of the etched region is flexible.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figures, wherein:

FIGS. 1a and 1b are schematic side views of a single (1a) prior art slider flying above a rotating disk surface and a plurality (1b) of such systems.

FIGS. 2a and b (prior art) are schematic representations of the ABS of a slider-mounted transducer (2a) and a slider-mounted transducer including a recessed region (2b).

FIG. 3a is a schematic view of a first embodiment wear pad of the invention.

FIG. 3b is a schematic view of a first embodiment wear pad after it is partially worn away.

DESCRIPTION OF THE PREFERRED EMBODIMENTS

Figure 4A:
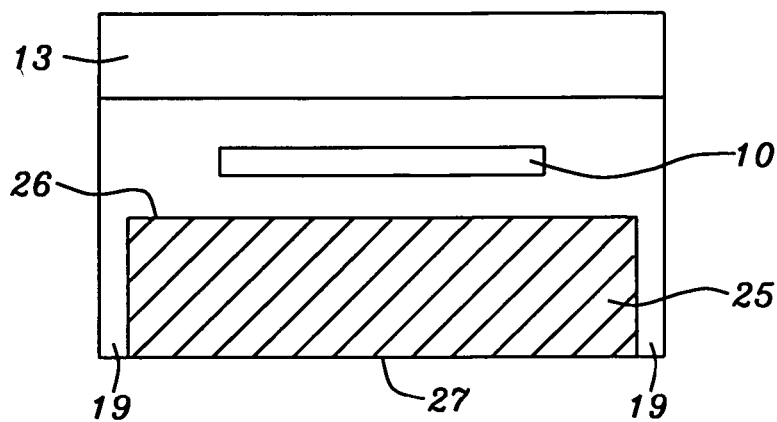
FIG. 4a is a schematic view of a second embodiment wear pad of the invention.

The preferred embodiments of the present invention provide sacrificial wear pads that are formed integrally with the ABS of a slider-mounted magnetic transducer. The wear pad so provided allows interferences between the slider and the surface of a moving disk to be detected, during disk-drive testing, at low flying-heights of the ABS relative to the disk surface, thereby allowing a low fly-height threshold to be set that will assure disk-drive reliability during subsequent normal use.

Referring first to FIG. 3a, there is shown the first embodiment of the present invention wherein a thin, un-etched strip of alumina (15), perpendicular to the transverse direction of the transducer (10), substantially bisects the recessed region (25) formed within the ABS of the slider. The width (transverse dimension) of the alumina strip (15) is less than 10 microns, the length of the strip (which is the first edge-to-trailing edge, (26) to (27), longitudinal dimension of recessed region) is between approximately 5 and 20 microns and the depth of the recessed region (25) is between approximately 0.05 and 0.2 microns. Because of the pitch of the ABS, the trailing edge of the strip flies approximately between 1 and 2 nm. closer to the disk surface than the transducer.

Referring next to FIG. 3b, there is shown the strip (17) of FIG. 3a now partially worn away as a result of interference with the disk during testing. As has already been noted, the strip remnant, symmetrically positioned downstream of the transducer, actually serves as a stress-reduction mechanism while it is present, but, in any event, it is quickly worn away during subsequent assembly and usage.

Referring next to FIG. 4a, there is shown a second embodiment of the present invention wherein two un-etched strips of alumina (19) are now located at opposite lateral edges of the recessed region (25) within the slider ABS. Within this embodiment there could be only a single strip or there could be a plurality of strips, but they are to be located off-center relative to the width (lateral dimension) of the slider. The dimensions of each strip are substantially the same as that of the single strip of FIG. 3a, but as the number of such strips increases (if more than one strip is formed), the total volume should not increase substantially beyond the volume of a single strip so that the wearing off of the strips should properly occur. It is further noted that the off-center location of the strips make them a particularly effective detector of slider roll (change in angle between the ABS plane in the lateral direction) relative to the disk surface, as well as detecting fly-height. Further, partial wear removal of off-centered strips, as compared to that shown in FIG. 3b for the central strip, does not reduce transducer mechanical stresses, because of the assymetrical downstream location of the strips.

Figure 4B:
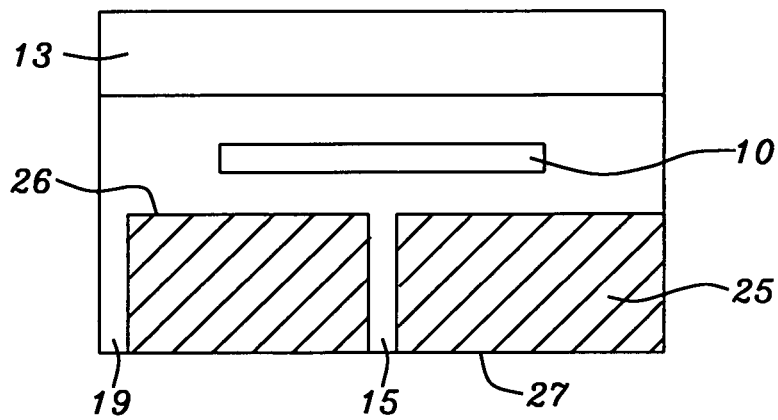
FIG. 4b is a schematic view of a combination of wear pads of the first and second embodiments.

Referring next to FIG. 4b, there is shown the combination of a centrally located strip (15) of the first embodiment and a single off-centered strip (19) of the second embodiment, to form a third embodiment of the present invention.

Figure 5:
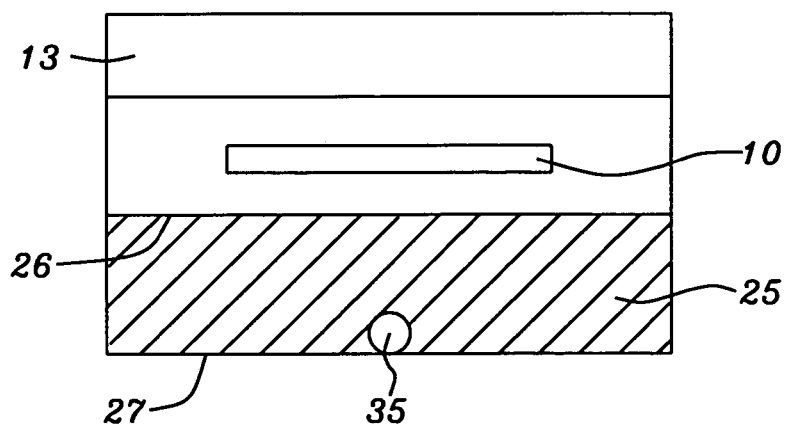
FIG. 5 is a schematic view of a third preferred embodiment wear pad of the invention.

Referring finally to FIG. 5, there is shown a deposited wear pad (35) that is not simply an un-etched portion of the slider ABS. The pad is shown here as having an approximately circular cross-section, but the cross-sectional shape is arbitrary, and it is formed by the deposition of a carbon overcoat onto the slider surface near the trailing edge of the slider. The pad can be deposited directly upon the etched recessed surface (25), as it is here, or it can be deposited within an additionally recessed region within the etched surface. The thickness of the carbon overcoat and the depth of the etched region on which it is formed are relatively flexible, but the protrusion height of the overcoat wear pad relative to the transducer ABS surface should be sufficient to achieve the objects of the invention. In this embodiment, the protrusion height is less than 2 nm.

In any of the above preferred embodiments, as well as in variations which might be conceived of by persons skilled in the art, it is to be noted that the maximum protrusion of the wear pad occurs during its initial use, when the slider flies over the disk surface for the first time. The use of the present invention, in any of its embodiments, does not preclude the concurrent use of other methods known to reduce slider fly height and, thereby, to intensify slider-disk interference. For example, the slider may be intentionally flown at a skewed angle, the disk speed may be intentionally altered or the gas pressure and/or gas composition may be altered. These methods may also be used to remove the wear pad after it has served its purpose.

In a disk drive that includes a plurality of sliders and associated disks, the wear pads can also be completely worn away during normal usage as follows. When the disk drive is formatted, the sliders should be ranked in the order of the intensity of the interference they encountered. This can be accomplished, for example, by noting the position error signal (PES) in the disk servo log. The slider with the least interference is used first for read/write operations, the slider with the most interference is used last. By the time that the disk drive is full enough that the last slider has been used, its wear pad has worn out sufficiently that it functions normally, even at high-altitude.

To achieve a similar result, in a disk drive with a plurality of sliders and disks, the disks may be formatted in such a sequence that the disk surface with least head-to-disk interference is formatted first. This strategy is especially useful if one surface of the disk drive is first formatted by an external instrument (ie. an encoder) and the remaining surfaces are formatted subsequently in the absence of such an external instrument (ie. self-formatting).

As is understood by a person skilled in the art, the preferred embodiments of the present invention are illustrative of the present invention rather than limiting of the present invention. Revisions and modifications may be made to methods, materials, structures and dimensions employed in the formation of an integral sacrificial wear pad for detecting interferences between a slider-mounted transducer and a rotating disk within a disk-drive system during testing, while still providing such an integral sacrificial wear pad for detecting interferences between a slider-mounted transducer and a rotating disk within a disk-drive system during testing, in accord with the spirit and scope of the present invention as defined by the appended claims.

What is claimed is:

1. A slider-mounted transducer having an integral wear pad for detecting interference between said slider-mounted transducer and a disk surface comprising:
   a slider-mounted transducer, said slider being bounded by two parallel lateral edges and a transverse trailing edge that is perpendicular to said lateral edges and said slider having an air-bearing surface (ABS) further comprising:
   a planar portion and a substantially rectangular recessed portion that is recessed relative to said planar portion, said recessed portion being bounded by said lateral edges and by first and second separated parallel transverse edges, the second transverse edge being the trailing edge of the slider and the first transverse edge being between the transducer and said second edge; and
   a wear pad formed as a longitudinal strip on said recessed surface, said strip extending perpendicularly from said first edge to said second edge and bisecting said rectangular recessed region, said strip having a transverse width and an upper surface that is substantially coplanar with said ABS.

2. The slider-mounted transducer of claim 1 wherein said recessed region is formed by etching said ABS and wherein said longitudinal strip is an un-etched region.

3. The slider-mounted transducer of claim 1 wherein the recessed surface is between approximately 0.05 and 0.2 microns below the planar portion of the ABS.

4. The slider-mounted transducer of claim 1 wherein the transverse width of said strip is less than approximately 10 microns.

5. A slider-mounted transducer having a integral wear pads for detecting interference between said slider-mounted transducer and a disk surface comprising:
   a slider-mounted transducer, said slider being bounded by two parallel lateral edges and a transverse trailing edge that is perpendicular to said lateral edges and said slider having an air-bearing surface (ABS) further comprising:
   a planar portion and a substantially rectangular recessed portion that is recessed relative to said planar portion, said recessed portion being bounded by said lateral edges and by first and second separated parallel transverse edges, the second transverse edge being the trailing edge of the slider and the first transverse edge being between the transducer and said second edge; and a plurality of wear pads formed as longitudinal strips on said recessed surface, said strips extending perpendicularly from said first edge to said second edge and each of said strips having a transverse width and a volume and an upper surface that is substantially coplanar with the planar portion of said ABS.

6. The slider-mounted transducer of claim 5 wherein said recessed region is formed by etching said ABS and wherein each of said longitudinal strips is an un-etched region.

7. The slider-mounted transducer of claim 5 wherein the recessed surface is between approximately 0.05 and 0.2 microns below the ABS.

8. The slider-mounted transducer of claim 5 wherein the transverse width of each said strip is chosen so that the total volume of all the strips to be removed during testing is between approximately 0.05 and 0.2 cubic microns.

9. The slider mounted transducer of claim 5 wherein one of the plurality of strips bisects the recessed region.

10. A slider-mounted transducer having an integral wear pad for detecting interference between said slider-mounted transducer and a disk surface comprising:

a slider-mounted transducer, said slider being bounded by two parallel lateral edges and a transverse trailing edge that is perpendicular to said lateral edges and said slider having an ak-bearing surface (ABS) further comprising:

a planar portion and a substantially rectangular recessed portion that is recessed relative to said planar portion, said recessed portion being bounded by said lateral edges and by first and second separated parallel transverse edges, the second transverse edge being the trailing edge of the slider and the first transverse edge being between the transducer and said second edge; and a wear pad formed on said recessed surface, said wear pad being transversely centered and substantially contacting said second transverse edge and said wear pad being a region of regular geometric cross section on which an overcoat, having a thickness and an upper surface raised above said planar ABS portion, has been deposited.

11. The slider-mounted transducer of claim 10 wherein said recessed region is formed by etching said ABS.

12. The slider-mounted transducer of claim 10 wherein the recessed surface is between approximately 0.05 and 0.2 microns below the planar portion of said ABS.

13. The slider-mounted transducer of claim 10 wherein the wear pad is a circular region of radius between approximately 5 and 10 microns on which is deposited a carbon overcoat of thickness sufficient to raise its upper surface less than 2 nm above said planar ABS portion.

14. A disk-drive including a plurality of slider mounted transducers and associated disks, wherein each slider mounted transducer includes an integral wear pad for detecting interference between said transducer and the surface of an associated disk and wherein each slider mounted transducer further comprises:

a slider-mounted transducer, said slider being bounded by two parallel lateral edges and a transverse trailing edge that is perpendicular to said lateral edges and said slider having an air-bearing surface (ABS) further comprising:

a planar portion and a substantially rectangular recessed portion that is recessed relative to said planar portion, said recessed portion being bounded by said lateral edges and by first and second separated parallel transverse edges, the second transverse edge being the trailing edge of the slider and the first transverse edge being between the transducer and said second edge; and a wear pad formed on said recessed surface, said wear pad being transversely centered and substantially contacting said second transverse edge and said wear pad being a region of regular geometric cross section on which an overcoat, having a thickness and an upper surface projecting above said planar ABS portion, has been deposited.

15. A method for removing integral wear pads, during normal use, from a plurality of slider mounted transducers within a disk drive after said wear pads have been used, during testing of said disk drive, to determine a minimum fly-height threshold, comprising:

during disk drive testing, rank each slider mounted transducer in order of intensity of slider-disk interference events, said intensity being determined by the use of a position error signal (PES) servo log;

during disk drive normal use, first use the slider mounted transducer with least interference intensity for read/write operations, then use the remaining slider mounted transducers in order of increasing interference intensity, using the slider mounted transducer with the greatest intensity last.

16. A method for removing integral wear pads, during disk formatting, from a plurality of slider mounted transducers within a disk drive after said wear pads have been used, during testing of said disk drive, to determine a minimum fly-height threshold, comprising:

during disk formatting, first format the disk that has exhibited the least amount of head-to-disk interference, using an external formatting instrument;

then, format the remaining disks without using such an external instrument.

* * * * *